United States Patent [19]
Omura

[11] Patent Number: 5,815,317
[45] Date of Patent: Sep. 29, 1998

[54] EYEPIECE WITH BROAD VISIBILITY

[75] Inventor: Yasuhiro Omura, Tokyo, Japan

[73] Assignee: Nikon Corporation, Tokyo, Japan

[21] Appl. No.: 813,760

[22] Filed: Mar. 7, 1997

[30] Foreign Application Priority Data

Mar. 14, 1996 [JP] Japan .................................. 8-085697

[51] Int. Cl.⁶ .................................................. G02B 25/00
[52] U.S. Cl. ........................................... 359/645; 359/643
[58] Field of Search ................................... 359/644, 645, 359/646, 643

[56] References Cited

U.S. PATENT DOCUMENTS 3,975,088   8/1976   Shoemaker ............................... 359/645

FOREIGN PATENT DOCUMENTS 50-151163   12/1975   Japan .
55024084    6/1977    Japan .
60-140919   9/1985    Japan .

*Primary Examiner*—Georgia Y. Epps
*Assistant Examiner*—Evelyn A. Lester
*Attorney, Agent, or Firm*—Chapman and Cutler

[57] ABSTRACT

An eyepiece with a wide field of view is made up of only a few spherical lenses, has a wide viewing angle, and includes eye relief of extensive length. The intrinsic aberration and the aberration of the pupil are favorably corrected. The eyepiece includes, in order from an object side, a positive meniscus lens having a convex surface which faces an eyepoint, a bonded biconvex lens made up of a biconvex lens and a negative meniscus lens with a concave surface facing the object side, and a positive lens with a convex surface which faces the object side. The bonded surface of the bonded biconvex lens has negative refractivity. The positive lens with the convex surface facing the object side is either a plano-convex lens with a planar side facing the eyepoint side or a positive meniscus lens with a concave surface facing the eyepoint side. Certain prescribed conditional equations are satisfied.

6 Claims, 6 Drawing Sheets

H = 12.5 (FN =1.1)
SPHERICAL ABERRATION OF PUPIL

Y = 12.5
ASTIGMATIC ABERRATION

DISTORTION ABERRATION

CHROMATIC DIFFERENCE OF MAGNIFICATION

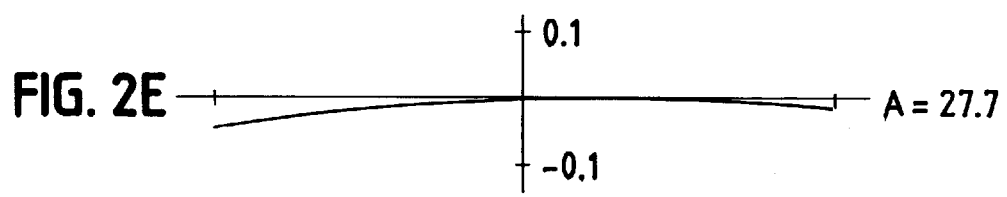
FIG. 2E  A = 27.7
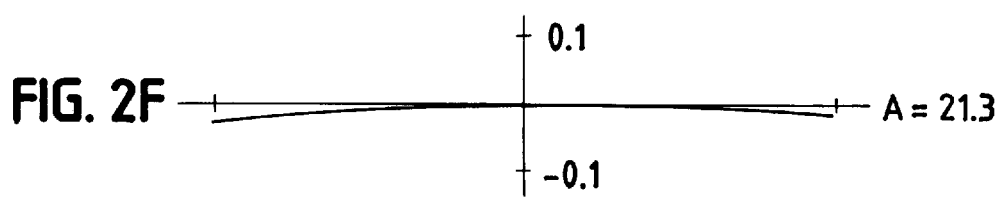
FIG. 2F  A = 21.3
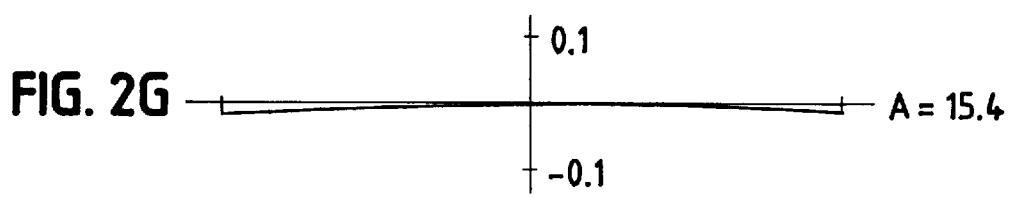
FIG. 2G  A = 15.4
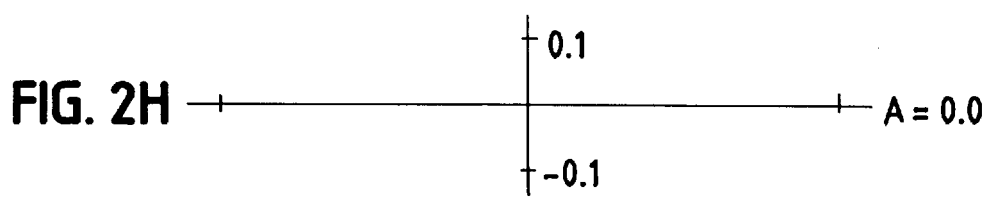
FIG. 2H  A = 0.0
HORIZONTAL ABERRATION

H = 12.5 (FN =1.1)

SPHERICAL ABERRATION OF PUPIL

Y = 12.5

ASTIGMATIC ABERRATION

DISTORTION ABERRATION

CHROMATIC DIFFERENCE OF MAGNIFICATION

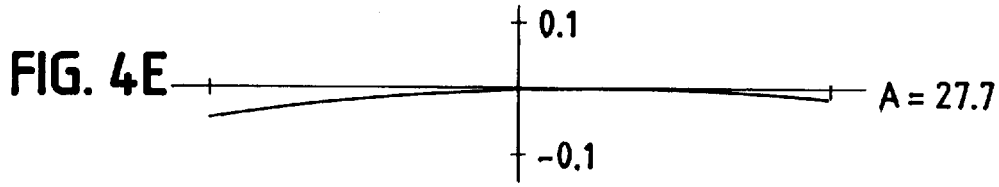
FIG. 4E  A = 27.7
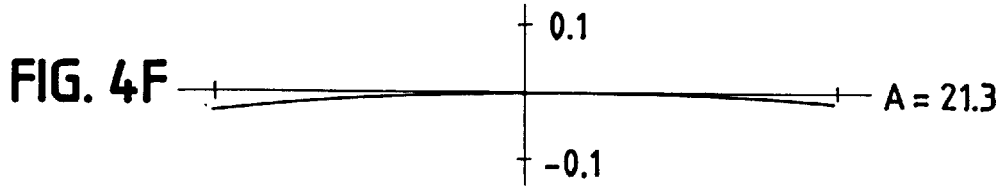
FIG. 4F  A = 21.3
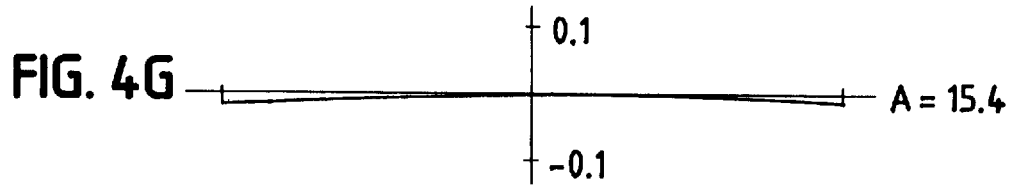
FIG. 4G  A = 15.4
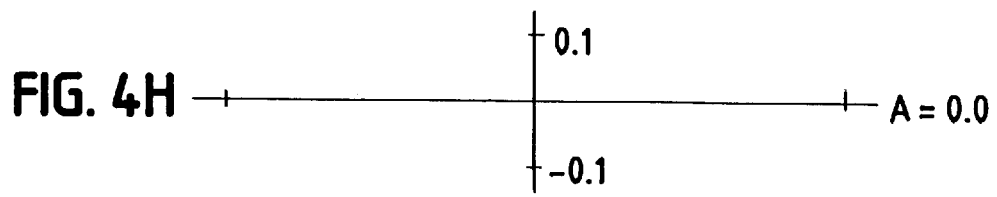
FIG. 4H  A = 0.0
HORIZONTAL
ABERRATION

EYEPIECE WITH BROAD VISIBILITY

BACKGROUND OF THE INVENTION

1. Field of the Invention

The present invention pertains to an eyepiece with a wide angle lens and, more specifically, to an eyepiece providing a wide field of view which is used in microscopes and similar devices.

2. Description of Related Art

Many suggestions have been made for eyepieces used in microscopes, etc. In one recently developed eyepiece, the field of view was broadened and an on-axis distance between a surface of the ocular pupil and an eyepoint (hereinafter referred to as an "eye relief") was increased. When securing a wide field of view and an eye relief of substantial length, however, aberrations such as distortion aberration, astigmatism, and spherical aberration of the pupil tend to increase. Conventional eyepieces with wide fields of view for correcting these aberrations are disclosed, for example, in Japanese Kokai Patent Application No. Sho 50[1975]-151163, Japanese Kokoku Patent No. Sho 55[1980]-24084, and Japanese Kokai Utility Model No. Sho 60[1985]-140919.

It is generally necessary, in eyepiece aberration correction, to correct several aberration types. Compensation for both an aberration in the object image surface when light is incident from the eyepoint (observation side) and an aberration in the eyepoint position (observation point) when light is incident from the object image surface (object side) must be provided. In other words, compensation must be made for both an intrinsic eyepiece aberration and a pupil aberration. The incident pupil position of the eyepiece is changed by modifying the optical system and interposing an object lens in the optical path between the object lens and the eyepiece. It is necessary to correct the aberration of the eyepiece so that the aberration variation of the eyepiece due to the change in the incident pupil position is adequately suppressed.

The intrinsic aberration of the eyepiece, the aberration of the pupil, and the aberration variation due to a change in the incident pupil position are interrelated. Individual aberrations cannot be corrected independently. Also, since microscopes are now used in various observation methods, the number of optical elements interposed in the optical path between an object lens and an eyepiece is now fairly high. The incident pupil position of the eyepiece, therefore, frequently approaches the object. As a result, if one attempts to secure an eye relief of sufficient length, proper correction of aberration at the peripheral part of the visual field is extremely difficult. For this reason, in a conventional eyepiece with a wide viewing angle formed from only four or so spherical lenses, the aberrations cannot be properly corrected.

If the optical system is complicated by increasing the number of lenses to correct each aberration, then the generation of stray light, such as lens flare due to reflection at the lens surface, is increased. A marked reduction in the contrast of the observation image will result in this case.

In what is known as an "intermediate imaging" type of eyepiece, in which an object image is formed between two lenses in the eyepiece, the correction of each aberration type is relatively easy. However, since various types of masks (for example, a mask in which grids are formed) are now used to locate positions at which the object image is formed, an intermediate imaging type of eyepiece is not appropriate.

Also, in an intermediate imaging type of eyepiece, an increase in the number of lenses required cannot be avoided.

A method for favorably correcting an aberration by forming a lens surface of an eyepiece in an aspheric shape has also been considered. However, in this case, the manufacturing costs are increased considerably by the introduction of an aspheric lens.

SUMMARY OF THE INVENTION

The present invention considers the problems mentioned above. A primary object of this invention is to provide an eyepiece with a wide field of view, which is formed from only a few spherical lenses, in which a viewing angle and an eye relief are large, and in which intrinsic aberrations, such as distortion aberration and astigmatism, the aberration of the pupil, and the aberration variation due to a change in the incident pupil position, are favorably corrected.

The present invention provides an eyepiece with a wide field of view. The eyepiece includes, in order from an object side, a positive meniscus lens with a convex surface facing an eyepoint side, a bonded biconvex lens including a biconvex lens and a negative meniscus lens with its concave surface facing the object side, and a positive lens with its convex surface facing the object side. The bonded surface of the bonded biconvex lens has negative refractivity. The positive lens is either a plano-convex lens with a planar side facing the eyepoint side or a positive meniscus lens with a concave surface facing the eyepoint side. Assuming the bonded surface of the bonded biconvex lens to have a radius of curvature r4, the object-side surface of the positive lens to have a radius of curvature r6, the eyepoint-side surface of the positive lens to have a radius of curvature r7, the refractive index of the biconvex lens G2 with respect to a d-line to be n2, the refractive index of the negative meniscus lens with respect to the d-line to be n3, and the focal length of the overall eyepiece to be F, the following conditions are met:

$$-0.45 < (n3-n2)\ F/r4 < -0.25;$$

$$-0.12 < F/r7 < 0.17;\ \text{and}$$

$$-0.1 < r6/r7 < 0.16.$$

Preferably, when the on-axis thickness of the positive meniscus lens mentioned above is d1, the radius of curvature of the surface of the object-side of the positive meniscus lens is r1, the radius of curvature of the surface of the eyepoint side of the positive meniscus lens is r2, the refractive index of the negative meniscus lens with respect to the d-line is n1, and the focal length of the overall eyepiece is F, the following conditions are met:

$$0.10 < d1/F < 0.26;$$

$$1.0 < (n1-1)\ r1/r2 < 2.6;\ \text{and}$$

$$0.20 < (r1-r2)/(r1+r2) < 0.58.$$

DESCRIPTION OF THE PREFERRED EMBODIMENTS

Figure 1:
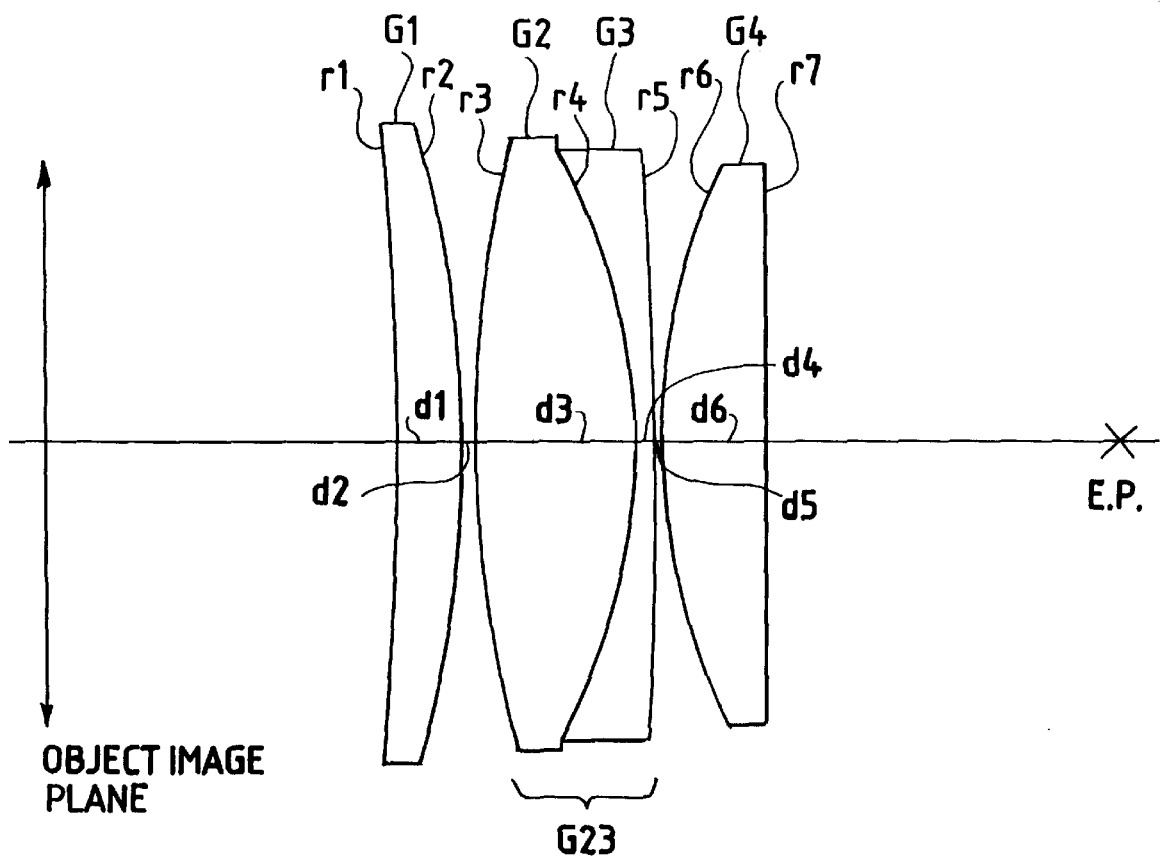
FIG. 1 is a side view of an eyepiece lens construction according to a first embodiment of the invention for an eyepiece with a wide field of view.
Figure 2A:
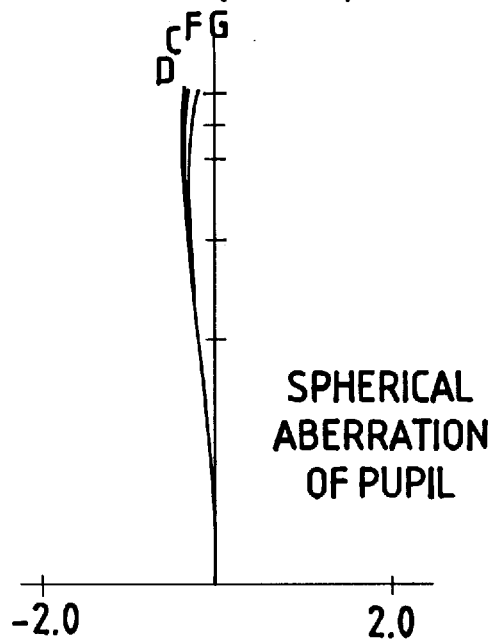
FIG. 2 shows aberration diagrams resulting when the incident pupil position is oriented toward an object side of the eyepiece and at 800 mm from the object-side surface of a positive meniscus lens according to the first embodiment.
Figure 2B:
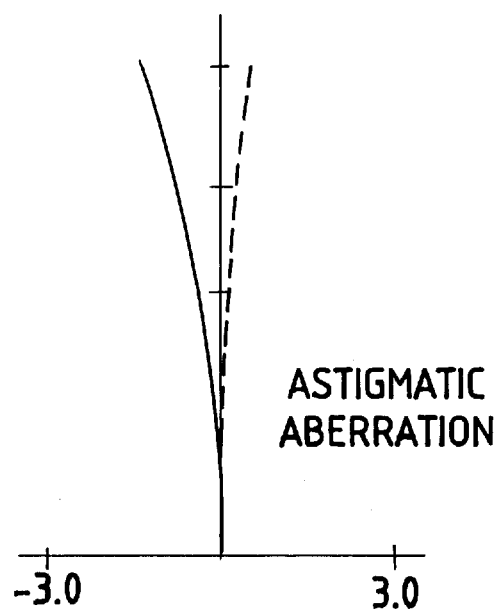
Figure 2C:
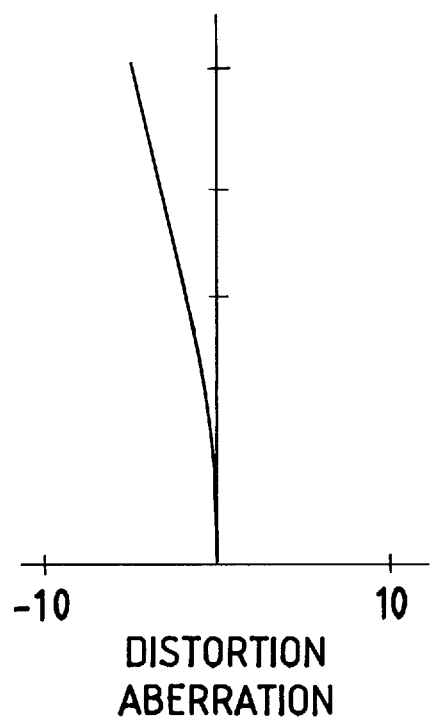
Figure 2D:
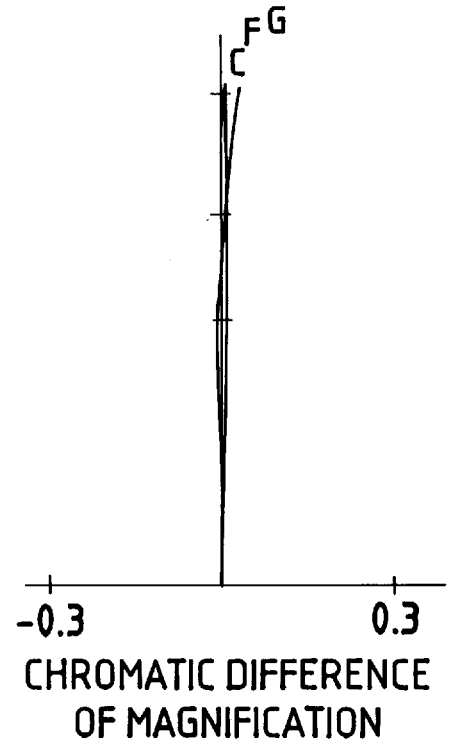

In general, if distortion aberration is corrected in an eyepiece formed only from spherical lenses, then a lens surface M having strong negative refractivity is required. Also, when correcting coma or transverse aberration and considering the curvature of an image plane, it is preferable to locate a concave lens surface at an object side of the eyepiece system. If the eyepiece is formed from only four spherical lenses, moreover, then a correction of chromatic aberration is required for the lens surface M. In order to correct both a chromatic difference of magnification and a chromatic aberration of the pupil, with a spherical aberration of the pupil which changes as a function of the light wavelength, the lens surface M is preferably located in the middle of the lens arrangement of the overall eyepiece system.

The present invention is provided with a lens arrangement including a positive lens, such as a positive meniscus lens G1, a bonded lens, such as a bonded biconvex lens G23, and a positive lens, such as a positive lens G4, in order from an object side of the system. A strong negative refractivity is provided to the bonded surface of the bonded biconvex lens G23. This biconvex lens G23 is formed by combining a biconvex lens G2 and a negative meniscus lens G3. The concave surface of the negative meniscus lens G3 faces the object. Thus, in the present invention, aberrations such as distortion aberration, coma aberration, curvature of an image plane, chromatic difference of magnification, and chromatic aberration of the pupil can be favorably corrected.

Various conditional equations of the present invention will now be explained.

An eyepiece with a wide viewing angle according to the present invention satisfies the following conditional equations (1)–(3).

$$-0.45 < (n3-n2) \, F/r4 < -0.25 \quad (1)$$

$$-0.12 < F/r7 < 0.17 \quad (2)$$

$$-0.1 < r6/r7 < 0.16 \quad (3)$$

In equations (1)–(3), r4 is a radius of curvature of the bonded surface of the bonded biconvex lens G23, r6 is a radius of curvature of the object-side surface of the positive lens G4, r7 is a radius of curvature of the eyepoint-side surface of the positive lens G4, n2 is a refractive index of the biconvex lens G2 with respect to the d-line, n3 is a refractive index of the negative meniscus lens G3 with respect to the d-line, and F is a focal length of the overall eyepiece.

Conditional equation (1) specifies conditions for favorably correcting for distortion aberration, coma aberration, and curvature of the image plane.

When the upper limit of the conditional equation (1) is exceeded, the distortion aberration and the coma aberration cannot be adequately corrected.

On the other hand, below the lower limit of conditional equation (1), a high-order distortion aberration is generated, and distortion of the image can be clearly seen at a peripheral part of the visual field.

If an upper limit and a lower limit for conditional equation (1) are respectively set to −0.28 and −0.40, then a favorable aberration correction is enabled.

Conditional equation (2) specifies conditions for favorably correcting the coma aberration and the distortion aberration.

When the upper limit of the conditional equation (2) is exceeded, it becomes difficult to correct for the coma aberration.

On the other hand, below the lower limit of conditional equation (2), it becomes difficult to correct for the distortion aberration. Also, peripheral light reflected on the surface of the eyepoint of the positive lens G4 tends to enter the eye of an observer and make observation difficult.

If an upper limit and a lower limit for conditional equation (2) are respectively set to 0.15 and 0, then a favorable aberration correction is enabled.

Conditional equation (3) specifies conditions for favorably correcting the coma aberration and the distortion aberration while securing eye relief of adequate length.

When the upper limit of the conditional equation (3) is exceeded, it is difficult to both secure a sufficiently long eye relief and correct for the coma aberration.

On the other hand, below the lower limit of the conditional equation (3), it is difficult to correct for the distortion aberration.

If an upper limit and a lower limit for conditional equation (3) are respectively set to 0.13 and 0, then a favorable aberration correction is enabled.

It is also desirable to satisfy the following conditional equations (4)–(6).

$$0.10 < d1/F < 0.26 \quad (4)$$

$$1.0 < (n1-1) \, r1/r2 < 2.6 \quad (5)$$

$$0.20 < (r1-r2)/(r1+r2) < 0.58 \quad (6)$$

In equations (4)–(6), d1 is an on-axis thickness of the positive meniscus lens G1, r1 is a radius of curvature of the object-side surface of the positive meniscus lens G1, r2 is a radius of curvature of the eyepoint-side surface of the positive meniscus lens G1, and n1 is a refractive index of the positive meniscus lens G1 with respect to the d-line.

The on-axis thickness of the positive meniscus lens G1 is the distance along the optical axis between the object-side surface and the image-side surface of the positive meniscus lens G1.

When the upper limit of conditional equation (4) is exceeded, the size of the overall lens system is large, and the eyepiece tends to contact the nose of an observer during observation. Also, the on-axis distance between the object image plane and the positive meniscus lens G1 is too short. As a result, foreign matter, such as dust which adheres to the surface of the object-side of the positive meniscus lens G1, is easily observed. Furthermore, the manufacturing cost is also unfavorable.

On the other hand, below the lower limit of conditional equation (4), it is difficult to secure eye relief of sufficient length.

The upper limit and the lower limit, respectively, for conditional equation (4) can preferably be set to 0.2 and 0.12, respectively.

When the upper limit of conditional equation (5) is exceeded, it is difficult to secure eye relief of sufficient length.

On the other hand, below the lower limit of conditional equation (5), the refractivity share of biconvex lens G2 and the positive lens G4 is too large. Correction of aberration, therefore, becomes difficult.

The upper limit and the lower limit, respectively, for conditional equation (5) can preferably be set to 2.4 and 1.2, respectively.

When the upper limit of the conditional equation (6) is exceeded, and the incident pupil position is close to the object, it is difficult to correct for curvature of the image plane and spherical aberration of the pupil.

On the other hand, below the lower limit of conditional equation (6), a high-order aberration in the curvature of the image plane and spherical aberration of the pupil is generated.

The upper limit and the lower limit are preferably set to 0.55 and 0.27, respectively, in conditional equation (6).

It is also desirable to satisfy the following conditional equation (7).

$$0.5 < L/F < 0.9 \qquad (7)$$

In conditional equation (7), L is the total on-axis thickness of the overall eyepiece.

The total on-axis thickness of the overall eyepiece is the distance along the optical axis between the object-side surface of the positive meniscus lens G1 and the eyepoint-side surface of the positive lens G4.

When the upper limit of the conditional equation (7) is exceeded, the size of the overall lens system is large, and the eyepiece tends to contact the nose of the observer during observation. Also, it is difficult to secure eye relief of sufficient length.

Correction of each aberration is not possible below the lower limit of conditional equation (7).

Various embodiments of the present invention are more particularly described below with reference to the drawing figures.

In each embodiment, an eyepiece having a wide field of view includes, in order from an object side, a positive meniscus lens G1 having a convex surface which faces the eyepoint side, a bonded biconvex lens G23 made up of a biconvex lens G2 and a negative meniscus lens G3 with a concave surface which faces the object side, and the positive lens G4 having a convex surface which faces the object side. The bonded surface of the two joined convex lenses G23 has negative refractivity. The positive lens G4 is either a plano-convex lens having a planar side which faces the eyepoint side or a positive meniscus lens having a concave surface which faces the eyepoint side.

FIG. 1 shows an eyepiece lens construction in which the eyepiece has a wide field of view according to a first embodiment of the present invention.

The eyepiece shown in FIG. 1 includes, in order from an object side, a positive meniscus lens G1 having a convex surface facing the eyepoint side, a bonded biconvex lens G23 made up of a biconvex lens G2 and a negative meniscus lens G3 with a concave surface which faces the object side, and a plano-convex lens G4 having a convex surface which faces the object side. The reference character "E.P." represents the eyepoint in FIG. 1.

Various parameters of the first embodiment are shown in Table I. In Table I, F represents, in mm, the focal length of the overall eyepiece, and 2A represents the viewing angle (apparent visual field). De represents, in mm, an eye relief when an incident pupil position is toward the object side and at infinity, and DO represents, in mm, the distance, along the optical axis, between the object image plane and the object-side surface of the positive meniscus lens G1. Also, in Table I, the ordinal numbers on the left represent the sequence of each lens surface from the object side, and r represents, in mm, the radius of curvature of each lens surface. The letter d represents, in mm, the spacing between each lens surface. The letter n and the character ν respectively represent the refractive index and Abbe number with respect to the d-line ($\lambda = 587.6$ nm).

TABLE I

| | F = 25.00 | | |
| | 2A = 55.4° | | |
| | De = 18.8 | | |
| | D0 = 18.6 | | |

| | r | d | n | ν |
|---|---|---|---|---|
| 1 | −121.34 | 3.5 | 1.69680 | 55.6 |
| 2 | −41.07 | 0.7 | | |
| 3 | 49.30 | 8.5 | 1.51680 | 64.1 |
| 4 | −22.90 | 1.2 | 1.80518 | 25.3 |
| 5 | −139.94 | 0.2 | | |
| 6 | 27.01 | 5.2 | 1.74810 | 52.3 |
| 7 | ∞ | | | |

| Values corresponding to above conditions | | |
|---|---|---|
| (1) | (n3 − n2)F/r4 | = −0.31483 |
| (2) | F/r7 | = 0 |
| (3) | r6/r7 | = 0 |
| (4) | d1/F | = 0.14 |
| (5) | (n1 − 1)r1/r2 | = 2.05528 |
| (6) | (r1 − r2)/(r1 + r2) | = 0.49362 |
| (7) | L/F | = 0.772 |

FIG. 2 shows aberration diagrams resulting when the incident pupil position is oriented toward the object side and at 800 mm from the object-side surface of the positive meniscus lens G1. Astigmatic aberration, distortion aberration, coma (i.e., "transverse" or "horizontal") aberration, and chromatic magnification difference constitute aberrations on the object image plane when a ray is traced from the eyepoint. The spherical aberration of the pupil is an aberration at the eyepoint position when a ray is traced from the object image plane.

In each aberration diagram shown in FIG. 2, FN represents the F number and H represents, in mm, the incident pupil height. Y represents, in mm, the image height, A represents a half-angle value, in degrees, of the field of view, and D represents the d-line ($\lambda = 587.6$ nm). C represents the C-line ($\lambda = 656.3$ nm), and F represents the F-line ($\lambda = 486.1$ nm). G represents the g-line ($\lambda = 435.8$ nm). In the aberration diagram showing astigmatic aberration, solid lines represent the sagittal image plane and broken lines represent the meridional image plane.

As is apparent from each aberration diagram, in this application example, while securing a wide field of view (a field of view of 55.4°) and an eye relief of substantial length, aberrations are favorably corrected up to the periphery of the field of view.

Figure 3:
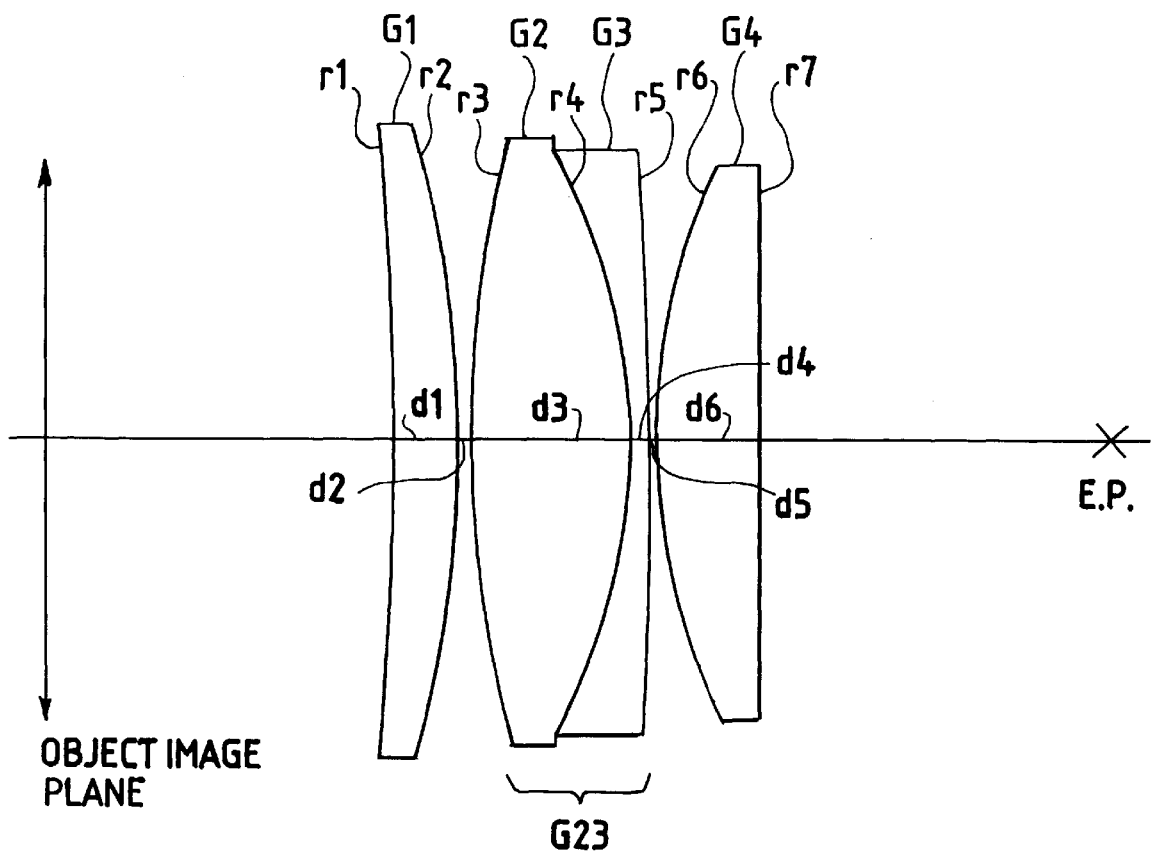
FIG. 3 is a view of an eyepiece lens construction similar to FIG. 1 but showing a second embodiment of the present invention.
Figure 4A:
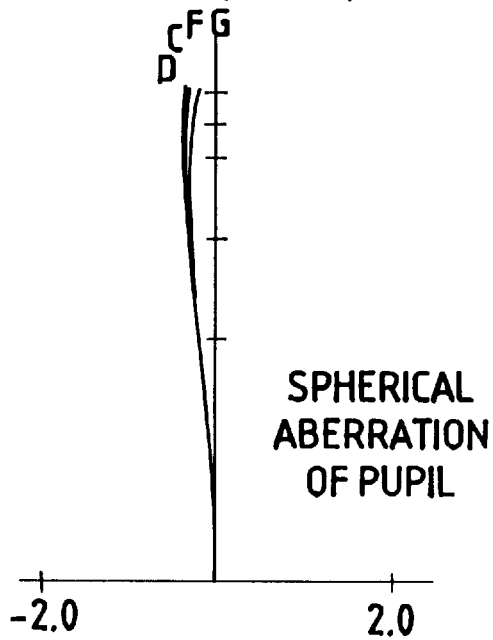
FIG. 4 shows aberration diagrams similar to those shown in FIG. 2 but resulting from the second embodiment of the invention.
Figure 4B:
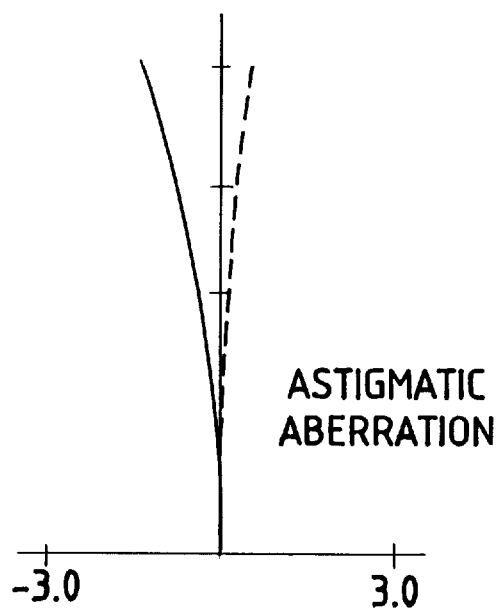
Figure 4C:
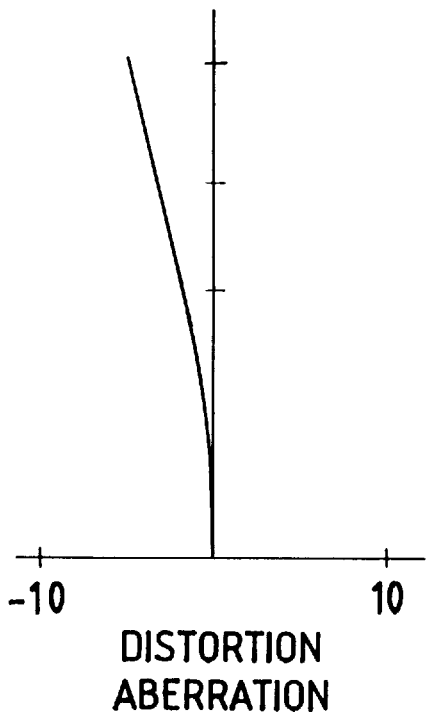
Figure 4D:
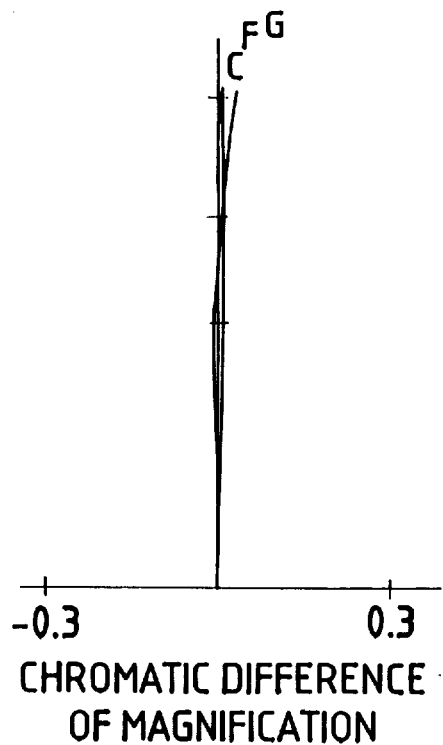

FIG. 3 shows an eyepiece lens construction in which the eyepiece has a wide field of view according to a second embodiment of the present invention.

The eyepiece shown in FIG. 3 includes, in order from the object side, a positive meniscus lens G1 having a convex surface facing the eyepoint side, a bonded biconvex lens G23 made up of a biconvex lens G2 and a negative meniscus lens G3 with a concave surface which faces the object side, and a plano-convex lens G4 having a convex surface which faces the object side. In FIG. 3, "E.P." represents the eyepoint.

Various parameters of the second embodiment are shown in Table II. In Table II, F represents, in mm, the focal length of the overall eyepiece, and 2A represents the viewing angle (field of view). De represents, in mm, the eye relief when the incident pupil position is toward the object side and at infinity, and DO represents, in mm, the distance, along the optical axis, between the object image plane and the object-side surface of the positive meniscus lens G1. Also, in Table II, the ordinal numbers on the left represent the sequence of each lens surface from the object side, and r represents, in mm, the radius of curvature of each lens surface. The letter d again represents, in mm, the spacing between each lens surface. The letter n and the character v again respectively represent the refractive index and Abbe number with respect to the d-line ($\lambda$=587.6 nm).

TABLE II

F = 25.00
2A = 55.4°
De = 18.8
D0 = 18.6

|   | r | d | n | v |
|---|---|---|---|---|
| 1 | −87.30 | 3.5 | 1.69680 | 56.2 |
| 2 | −37.74 | 0.7 |  |  |
| 3 | 43.48 | 8.5 | 1.51637 | 64.1 |
| 4 | −23.05 | 1.2 | 1.80627 | 25.4 |
| 5 | −165.89 | 0.2 |  |  |
| 6 | 27.02 | 5.2 | 1.74693 | 51.0 |
| 7 | ∞ |  |  |  |

Values corresponding to above conditions

| (1) | (n3 − n2)F/r4 | = −0.31443 |
|---|---|---|
| (2) | F/r7 | = 0 |
| (3) | r6/r7 | = 0 |
| (4) | d1/F | = 0.14 |
| (5) | (n1 − 1)r1/r2 | = 1.61183 |
| (6) | (r1 − r2)/(r1 + r2) | = 0.39635 |
| (7) | L/F | = 0.772 |

FIG. 4 shows aberration diagrams resulting when the incident pupil position is oriented toward the object side and at 800 mm from the object-side surface of the positive meniscus lens G1. Astigmatic aberration, distortion aberration, coma or horizontal aberration, and chromatic magnification difference constitute aberrations on the object image plane when a ray is traced from the eyepoint. The spherical aberration of the pupil is an aberration at the eyepoint position when a ray is traced from the object image plane.

In each aberration diagram shown in FIG. 4, FN represents the F number and H represents, in mm, the incident pupil height. Y again represents, in mm, the image height, A again represents a half-angle value, in degrees, of the field of view, and D again represents the d-line ($\lambda$=587.6 nm). C represents the C-line ($\lambda$=656.3 nm), and F represents the F-line ($\lambda$=486.1 nm). G again represents the g-line ($\lambda$=435.8 nm). Also, in the aberration diagram showing astigmatic aberration, solid lines represent the sagittal image plane and broken lines represent the meridional image plane.

Each aberration diagram, in this embodiment, shows that while securing a wide field of view (a field of view of 55.4°) and an eye relief of substantial length, aberrations are favorably corrected up to the periphery of the field of view.

It is clear from the description provided above that the present invention offers an eyepiece which is made up of only about four spherical lenses. The eyepiece also has a wide field of view and an eye relief of substantial length. Moreover, the intrinsic aberration, such as distortion and astigmatic aberration, and the aberration of the pupil, are favorably corrected according to the invention.

I claim:

1. An eyepiece with a wide field of view, comprising:

a positive meniscus lens with a convex surface facing an eyepoint side of the eyepiece, a bonded biconvex lens having a biconvex lens and a negative meniscus lens with a concave surface facing an object side of the eyepiece and a bonded surface of said bonded biconvex lens having negative refractivity, a positive lens with a convex surface facing the object side of the eyepiece, and said positive meniscus lens being closest to said object side, said positive lens being furthest from said object side, and said bonded biconvex lens being intermediate said positive meniscus lens and said positive lens, wherein the following conditions are met:

$0.10 < d1/F < 0.26$;

$0.20 < (r1−r2)/(r1+r2) < 0.58$;

$1.0 < (n1−1)\, r1/r2 < 2.6$, $−0.45 < (n3−n2)\, F/r4 < −0.25$;

$−0.12 < F/r7 < 0.17$; and $−0.1 < r6/r7 < 0.16$, where d1 is an on-axis thickness of said positive meniscus lens; F is the focal length of the overall eyepiece; r1 is a radius of curvature of an object-side surface of said positive meniscus lens; r2 is a radius of curvature of the convex surface of said positive meniscus lens; r4 is a radius of curvature of the bonded surface of said bonded biconvex lens; r6 is a radius of curvature of an object-side surface of said positive lens; r7 is a radius of curvature of an eyepoint-side surface of said positive lens; n1 is a refractive index of said positive meniscus lens with respect to a d-line; n2 is a refractive index of said biconvex lens with respect to a d-line, and n3 is a refractive index of said negative meniscus lens with respect to a d-line.

2. The eyepiece according to claim 1, wherein said positive lens is a plano-convex lens with a planar side facing the eyepoint side of the eyepiece.

3. The eyepiece according to claim 1, wherein said positive lens is a positive meniscus lens with a concave surface facing the eyepoint side.

4. The eyepiece as defined in claim 1, wherein the following condition is met:

$0.5 < L/F < 0.9$, where L is an on-axis total thickness of the overall eyepiece, and F is a focal length of the overall eyepiece.

5. The eyepiece according to claim 4, wherein said positive lens is a plano-convex lens with a planar side facing the eyepoint side.

6. The eyepiece according to claim 4, wherein said positive lens is a positive meniscus lens with a concave surface facing the eyepoint side.

* * * * *